UNITED STATES PATENT OFFICE.

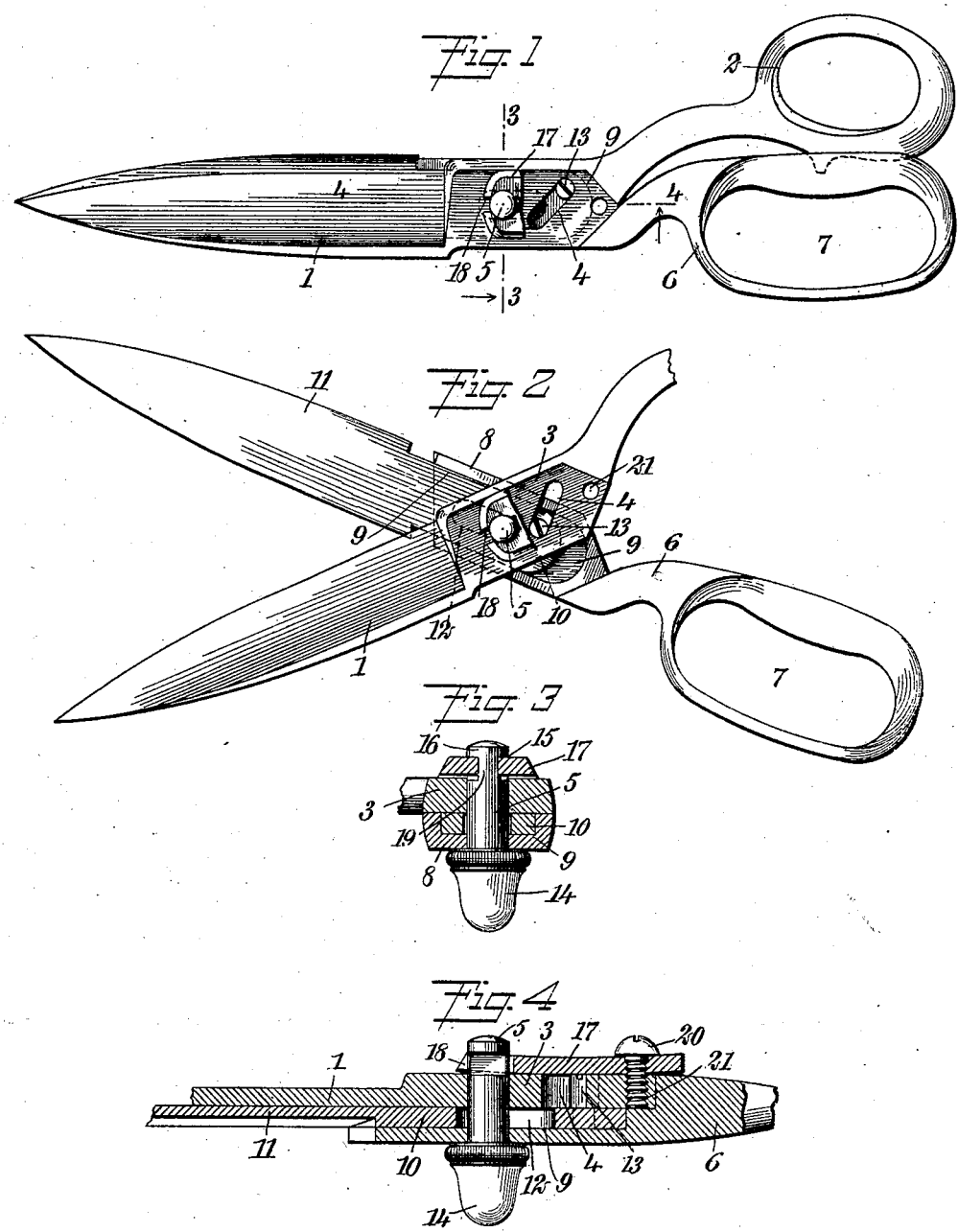

SVEN F. F. LINDAL, OF NEW YORK, N. Y., ASSIGNOR OF ONE-HALF TO ALFRED PETERSON, OF BROOKLYN, NEW YORK.

SCISSORS OR SHEARS.

No. 884,281.  Specification of Letters Patent.  Patented April 7, 1908.

Application filed December 24, 1907. Serial No. 407,875.

*To all whom it may concern:*

Be it known that I, SVEN F. F. LINDAL, a subject of the King of Sweden, and a resident of the city of New York, borough of Brooklyn, in the county of Kings and State of New York, have invented a new and Improved Scissors or Shears, of which the following is a full, clear, and exact description.

This invention relates to scissors or shears, and the object of the invention is to produce shears or scissors having a construction especially adapting them for cutting a number of thicknesses of cloth or similar material.

More specifically, the object of the invention is to increase the power or cutting force of the shears, and to provide an arrangement for enabling the blades of the shears to be held in good working contact without necessitating constant regrinding.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a pair of scissors or shears constructed according to my invention, certain parts being broken away; Fig. 2 is a view similar to Fig. 1, but representing the shears in open position, certain parts being broken away; Fig. 3 is a cross section on the line 3—3 of Fig. 1; and Fig. 4 is a longitudinal section taken on the line 4—4 of Fig. 1, and passing through the pivot bolt which connects the shear blades.

Referring more particularly to the parts, 1 represents the main blade or thumb blade, the same being provided with a handle or eye 2 which receives the thumb. At the butt of the blade a flat shank or cheek plate 3 is formed, which connects the blade with handle or eye 2, as shown, and in this shank an inclined slot 4 is formed, as shown. This shank is connected by a pivot bolt 5 with a finger handle 6, having an elongated eye 7 to receive the fingers in a well known manner. This finger handle 6 is formed with a shank 8 having a lateral guide channel 9 in one side, the channel opening toward the inner face of the shank 3 as shown. In the channel 9 there is received the tang 10 of the finger blade 11. This tang fits neatly in position so that the blade it is formed on is adapted to slide in or out of the channel 9. The blade 11 is further provided with a slot 12 through which the pivot bolt 5 passes. In addition to this, the tang 10 is provided, near its inner end, with a pin or screw 13, which is received in the aforesaid slot 4. The construction of the pivot bolt 5 appears very clearly in Fig. 3; it is provided on one end with an enlarged head 14. Its opposite end projects from the side face of the shears, and is cut away on each side so as to form notches 15 as shown. In this way, an overhanging or undercut head 16 is formed.

The pivot bolt is held in position, and the blades are firmly held together by means of a clamping plate 17. This plate is formed in its end with a notch 18 and is adapted to be thrust under the head 16 so as to engage the edges of said notch with the reduced neck 19 formed between the notches 15. This plate 17 is not flat, but is slightly convex on its inner side; that is, on the side which is placed against the side of the shears. Near the end of the clamping plate 17 remote from the notch 18, an adjusting screw 20 is provided, which passes through the plate 17 and makes a threaded connection in an opening 21 formed in the shank or cheek plate 3. It should be understood that the plate 17 is made of steel or similar resilient material. When the screw 20 is tightened up, the plate 17 rocks slightly on its point of contact which lies between the screw and the pivot bolt, and the holding force on the pivot bolt is increased. In operating the shears, when the eyes 2 and 7 are forced together, the inclined slot 4 controls the blade 11 so as to slide the blade inwardly in the shank 8, as the angle between the blades becomes diminished. In this way the shears have a drawing-in effect upon the layers of cloth, which tends to prevent puckering of the material at the cutting point of the shears. There is, moreover, produced a grinding or cutting effect which does not occur between shear blades connected by an ordinary pivot. The adjusting screw 20 evidently affords means for maintaining the blades tightly clamped together as the shears become worn with use.

Attention is called to the fact that the clamping plate 17 operates as a cover or guard for the slot 4 and pin 13 running in the slot. For this reason, the clamping plate performs a second function in addition to its function as a resilient clamping device for holding the blades of the shears together.

Having thus described my invention, I claim as new and desire to secure by Letters Patent:

1. In scissors or shears, in combination, a pair of handles having shanks pivoted together, one of said shanks being extended to form a blade therebeyond, the other of said shanks having a guide formed therein, a second blade sliding in said guide, and means for sliding said blade in said guide when said handles are moved with respect to each other.

2. In scissors or shears, in combination, a pair of handles having shanks pivoted together, one of said shanks being extended to form a blade therebeyond, the other of said shanks having a guide formed therein, a second blade sliding in said guide, and a pin-and-slot connection between said second blade and the shank carrying said first blade whereby the closing of said shears or scissors will slide said second blade.

3. In scissors or shears, in combination, a pair of handles having shanks, a pivot bolt connecting said shanks, one of said shanks having a blade formed therebeyond, the other of said shanks having a guide channel formed therein, a second blade slidably mounted in said guide channel and having a pin, and an inclined slot in said first shank receiving said pin and affording means for sliding said second blade when the scissors or shears are opened or closed.

4. In scissors or shears, in combination, a pair of handles having shanks, a pivot bolt connecting said shanks, one of said shanks having a blade formed therebeyond, and having an inclined slot therein, the other of said shanks having a guide channel formed therein, a blade having a tang slidably mounted in said channel, and having a slot receiving said pivot bolt, said tang further having a pin projecting into said inclined slot.

5. In scissors or shears, in combination, a pair of handles having shanks pivoted together, one of said shanks being extended to form a blade, the other of said shanks having a guide formed therein, a second blade sliding in said guide, a pin-and-slot connection between said second blade and the shank carrying said first blade, whereby the opening or closing of said shears will slide said second blade, and a clamping plate affording means for adjusting the said blades with respect to each other and covering said pin and slot.

6. In scissors or shears, in combination, a pair of handles having shanks, a pivot bolt connecting said shanks and projecting beyond the side of said scissors, a sliding blade mounted on one of said shanks and having a pin-and-slot connection with the other of said shanks whereby said sliding blade is moved in and out when the shears are operated, the other of said shanks having a blade formed therebeyond, a curved clamping plate engaging the projecting extermity of said bolt and covering said pin and slot, and means for adjusting said clamping plate to regulate the pressure between the blades of said shears.

In testimony whereof I have signed my name to this specification in the presence of two subscribing witnesses.

SVEN F. F. LINDAL.

Witnesses:
F. D. AMMEN,
EVERARD B. MARSHALL.